(12) United States Patent
Roberts et al.

(10) Patent No.: US 9,137,367 B1
(45) Date of Patent: Sep. 15, 2015

(54) SYSTEMS AND METHODS FOR REPRESENTATIVE CREDIT PREDICATED UPON RELATIONSHIP DEVELOPMENT

(71) Applicant: United Services Automobile Association (USAA), San Antonio, TX (US)

(72) Inventors: David W. Roberts, San Antonio, TX (US); Patrick R. Kelley, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 14/558,538

(22) Filed: Dec. 2, 2014

(51) Int. Cl.
*H04M 3/00* (2006.01)
*H04M 5/00* (2006.01)
*H04M 3/51* (2006.01)
*G06F 17/30* (2006.01)
*G06Q 10/06* (2012.01)

(52) U.S. Cl.
CPC ......... *H04M 3/5175* (2013.01); *G06F 17/3056* (2013.01); *G06F 17/30551* (2013.01); *G06Q 10/06398* (2013.01); *H04M 3/5133* (2013.01)

(58) Field of Classification Search
USPC ............................ 379/265.06, 265.09, 265.01
See application file for complete search history.

(56) References Cited

U.S. PATENT DOCUMENTS 5,884,032 A * 3/1999 Bateman et al. .............. 709/204
2013/0311222 A1* 11/2013 Chaturvedi et al. .......... 705/7.15

* cited by examiner

*Primary Examiner* — Quynh Nguyen
(74) *Attorney, Agent, or Firm* — Baker & Hostetler LLP

(57) ABSTRACT

Described herein are systems and methods for generating and ascribing credit to customer representatives for facilitating conversations between the customer and other customer representatives. A representative may store notes regarding an interaction with a customer. Subsequently, a different representative may utilize those notes to facilitate a future interaction with the customer, and accordingly and concurrently indicate that the notes were useful. As a result of this indication, a rating related to the original representative may be positively influenced. This information may also be used to measure the relationship between the company and the customer and/or as a measure of how some or all customer representatives are performing.

20 Claims, 3 Drawing Sheets

SYSTEMS AND METHODS FOR REPRESENTATIVE CREDIT PREDICATED UPON RELATIONSHIP DEVELOPMENT

BACKGROUND OF THE INVENTION

It can be difficult for corporations to develop and maintain meaningful relationships with their customers. While corporations generally want their member services representatives (MSR) to work as quickly as possible, encouraging faster customer interactions can come at the cost of fewer opportunities to identify the customer's future plans. For example, if a customer is planning on purchasing a home, but will not do so for several years, because no imminent activities are planned the MSR may be inclined to dismiss the customer. But this response reduces the chance that the corporation will position itself to assist the customer when they are finally ready to purchase a home.

Thus, there is an unmet need to provide positive reinforcement to MSRs when they take the time to develop the relationship between the customer and the corporation, even when there is not an immediate product or service that the customer requires.

SUMMARY OF THE INVENTION

To encourage more substantive interactions between customer and representatives, in one embodiment, described herein is a system for positively effecting a representative's rating by virtue of the representative receiving positive feedback for notations/documentation that the representative had provided regarding a customer interaction. In one example, a customer casually mentions that they may be interested in purchasing a home in several years. Because there is no immediate service that the representative may supply to the customer, the representative may otherwise be inclined to end the conversation quickly, and thus this information about the customer would be lost to the company. This system, however, would encourage the representative to save this information for later representatives, and thus facilitate those later interactions. If a representative's notes are utilized, the representative that originated the note, and possibly also the representative that utilized the note, may receive positive feedback regarding their performance because their cooperation improved the customer's interaction with the company, and possibly also enabled the company to identify and provide services and/or products that the customer may be interested in.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

The present disclosure is directed to a relationship management module and methods for operating the same. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

Figure 1:
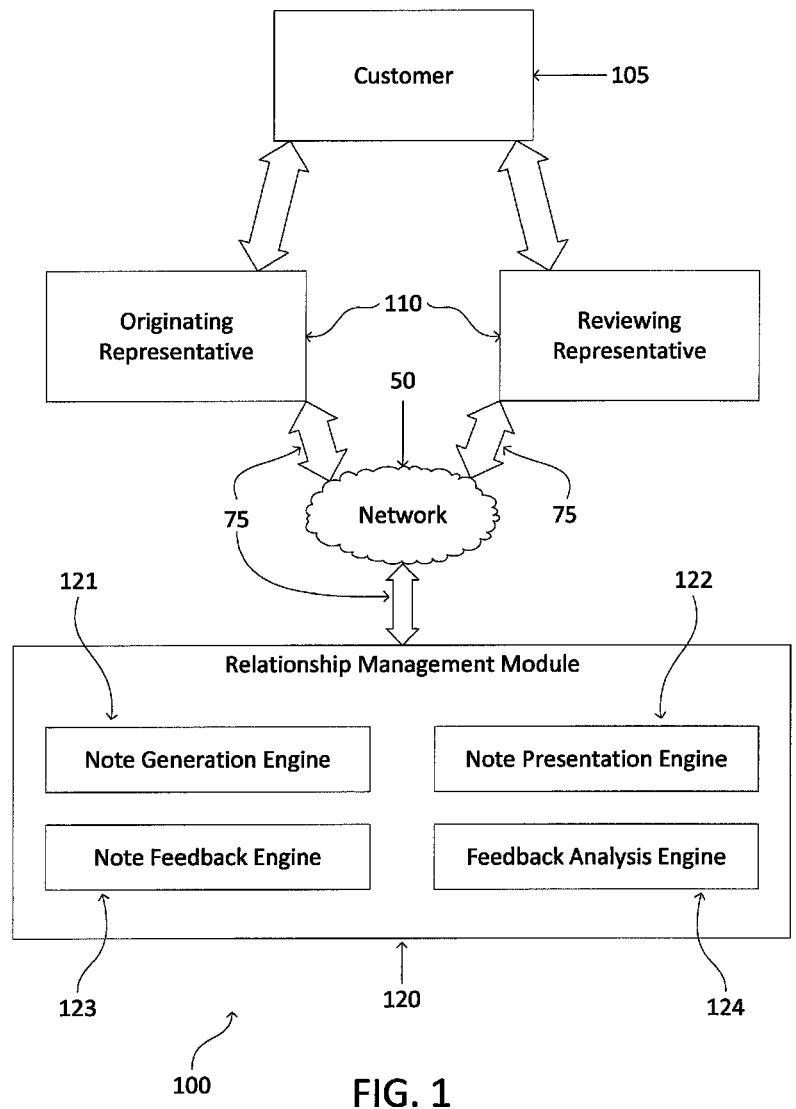
FIG. 1 depicts one embodiment of a system on which a relationship management module operates.
Figure 3:
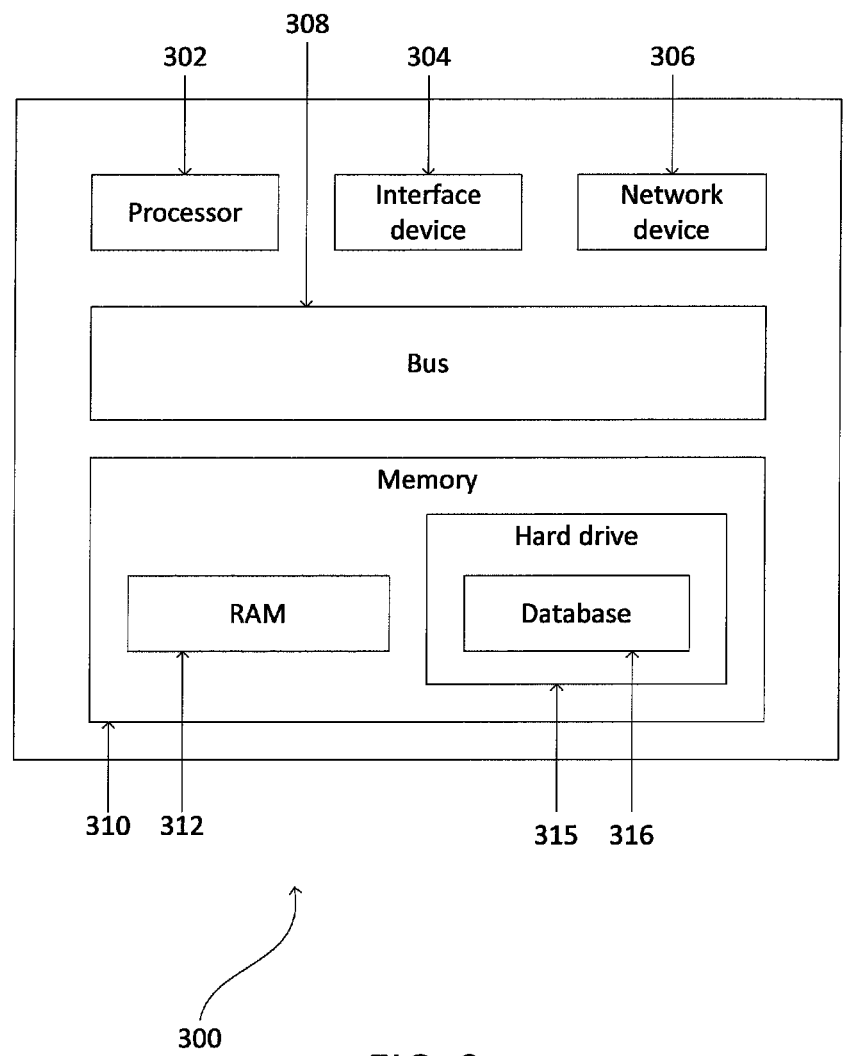
FIG. 3 depicts an exemplary computing device as might be used in FIGS. 1 and 2.

Referring to FIG. 1, illustrated therein is an exemplary hardware diagram depicting system 100 in which the processes described herein can be executed. In one example, system 100 includes relationship management module 120, customer 105 and representatives 110, which may each include a computing device 300, as shown in FIG. 3. Relationship management module 120 may include note generation engine 121, note presentation engine 122, note feedback engine 123, and/or feedback analysis engine 124.

Exemplary embodiments of computing devices include but are not limited to mobile devices, such as a multifunction "smart phones", personal computers, notebook computers, tablet computers, and/or server devices. It should be understood that computing devices each generally include at least one processor, at least one data interface, and at least one memory device coupled via buses. Computing devices may be capable of being coupled together, coupled to peripheral devices, and input/output devices. Computing devices, are represented in the drawings as standalone devices, but are not limited to such. Each can be combined with other devices in a distributed processing environment or divided into subcomponents. Computing devices may communicate with each other and/or with relationship management module 120 through network 50.

Relationship management module 120 in one example is one or more hardware and/or software components residing on a server or computer. In another example, relationship management module 120 is one or more hardware and/or software components residing on multiple servers or computers. In another example, relationship management module 120 is one or more hardware and/or software components residing on one or more computing devices. Thus, it should also be understood that relationship management module 120 may be capable of being coupled to other devices, coupled to peripheral devices, coupled to input/output devices, and/or coupled to other systems. Relationship management module 120 is represented in the drawings as a standalone device, but it is not limited to such. Relationship management module 120 may be coupled to other devices in a distributed processing environment. It must be noted that the functions describe herein may be combined or divided across computing devices.

Referring further to FIG. 1, it is to be appreciated that network 50 depicted in FIG. 1 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Relationship management module 120 and computing devices may communicate over network 50 through one or more communications links 75 formed between data interfaces of relationship management module 120 and computing devices, respectively. Communication links 75 may comprise either wired or wireless links. It is to be appreciated that the illustrated network connections of FIG. 1 are exemplary and other means of establishing a communications link between multiple devices may be used.

Still referring to FIG. 1, note generation engine 121 may be utilized by originating representative 110 to generate notes that will be used by a representative, such as reviewing representative 110. Note presentation engine 122 may be utilized to locate and display notes to representatives that are interacting with a customer of a company such as an insurance company. Note presentation engine 122 may further process interaction indications from representatives, such as reviewing representative 110.

In one example, originating representative 110 generates notes about a customer (e.g., the customer is saving up money for a down payment to purchase a home). Even though it will be several years before the customer is ready to purchase a home, the originating representative 110 adds a note to relationship management module 120, the note indicating that the customer will likely be interested in purchasing a home within several years. At some subsequent point in time (e.g., four years later), reviewing representative 110 discovers the note while conversing with the customer. For example, reviewing representative 110 could receive a notification that the note exists and may be relevant to the current interaction with the customer.

Reviewing representative 110 asks the customer about the home purchasing plans, and when the customer indicates the plan is going well (or at a minimum, when the customer indicates that this note was accurate at one time), the reviewing representative 110 positively rates the note, such as via note feedback engine 123. Positively rating the note may be via a pull-down rating menu near the note, and/or it may be via any means as would be recognized by those skilled in the art.

It is contemplated herein, that if the note relates to a product and/or service not offered by the company, the entering and/or reviewing representative may follow up on the note by facilitating developing a new and/or existing relationship between the customer and a third party that does offer the product and/or service. Subsequently, the notes relevant to the third party may be forwarded to the third party. It is contemplated herein that such forwarding may be implemented by sending an electronic message (e.g., email) to one or more computing devices associated with and/or operated by the third party.

It is contemplated herein that the notes and/or entries may be any documentation and/or notation as would recognized by those skilled in the art. It is further contemplated herein that customers as referred to herein may include prospective customers with which a business relationship has yet to be realized.

Feedback analysis engine 124 may be utilized to variously analyze ratings and/or utilizations of notes. For example, feedback analysis engine 124 may be utilized to identify a total number of database entries of note ratings (e.g., a total number of database entries where the individual being reviewed is either the originating representative or the reviewing representative, a total number of database entries where the individual being reviewed is the originating representative, a total number of database entries where the individual being reviewed is the reviewing representative). In one or more examples, this total number of database entries may be restricted to a time period (e.g., during this calendar month, within the last week/year).

Figure 2:
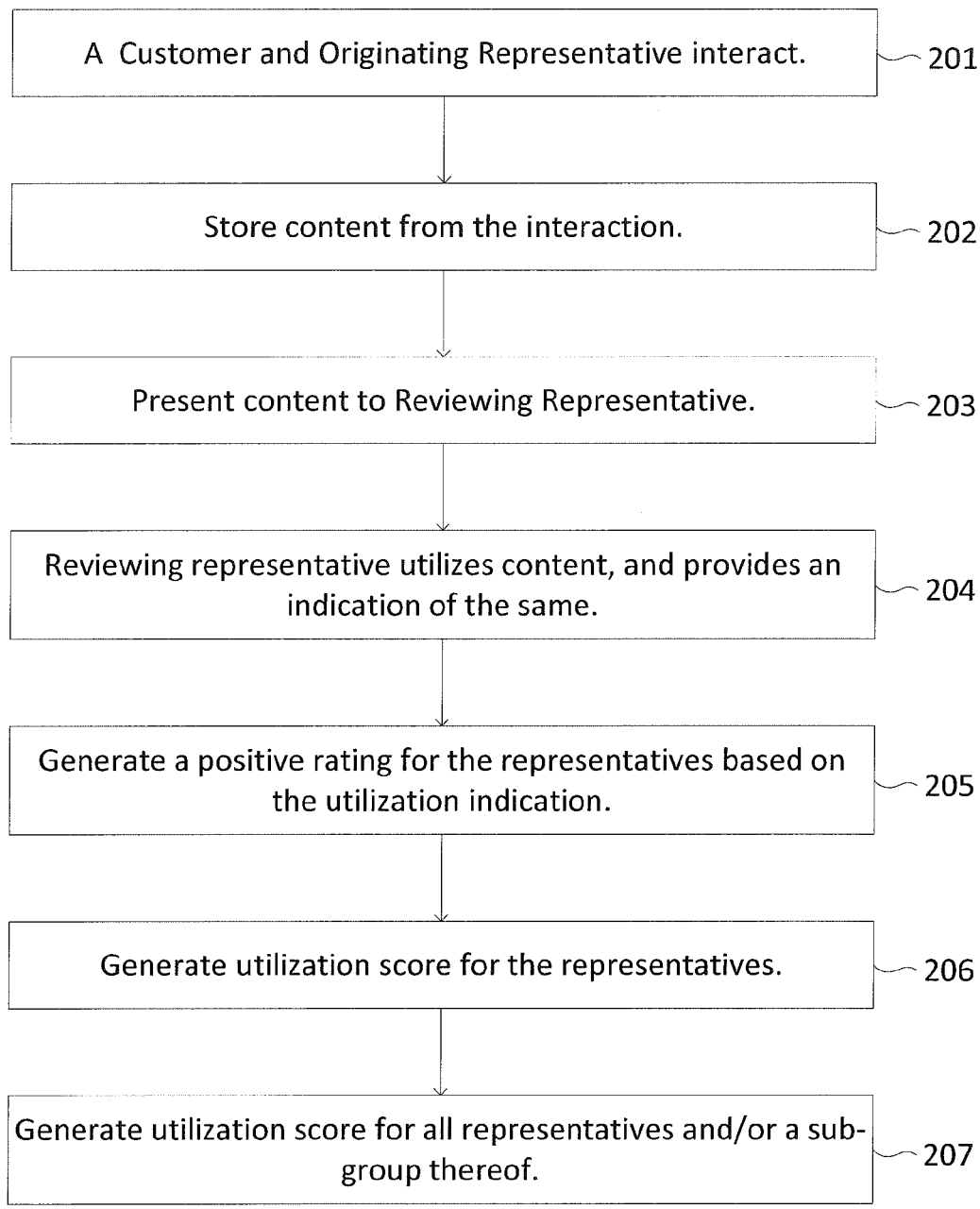
FIG. 2 is a flowchart depicting illustrative operation of the system of FIG. 1.

Referring to FIG. 2, exemplary operation of a process 200 of utilizing system 100 will now be described for illustrative purposes. Starting at step 201, a customer and an originating representative interact (e.g., via a phone call). The originating representative stores content (e.g., a note) from the interaction (step 202). Subsequently, the content (e.g., the note) is presented to a reviewing representative (step 203) that may be interacting with the customer at a later time. If and/or when the reviewing representative utilizes the content/note, the reviewing representative may provide an indication that the note was useful (step 204) and/or accurate (e.g., by giving the note, and implicitly the originating representative, a positive score).

The reviewing representative and/or the originating representative may receive and/or be associated with a positive rating because of the combination of the note generation and the note utilization. For example, if and/or when a note is used, the note's originating representative may receive a positive rating (e.g., at least one component of a rating for the originating representative may, at least in part, result from and/or be positively affected by the fact that the originating representative generated a note that received a positive rating). Such will hopefully encourage the originating representative, and indeed all representatives, to generate notes that may be later utilized. In another and/or the same example, if and/or when a note is used, the note's reviewing representative may (also) receive a positive rating.

In another embodiment, data entries may be utilized to measure the relationship between the company and one or more customers. For example, the number of data entries entered and/or utilized (total at any time, within the last day/week/year/decade) for one or more customers (e.g., a single customer, a specific group of customers such as all customers in their 30s, all customers) may be utilized for being at least somewhat indicative of the strength and/or quality of the company's relationship with that one or more customer. In another example, these data entries may be used as a company-wide MSR performance measure. In this example the company-wide MSR performance measure could be cumulative and/or a weighted average (e.g., greater weight to customers that call the company more frequently, greater weight to customers that do more business with the company, greater weight to MSRs that spend more time on the phone rather than merely part time on the phone). This company-wide MSR performance measure may be utilized as a metric to measure the company's relationship with its customers.

In still another example, the metric could be calculated based on the number of "points" per time interval (e.g., a minute) conversing with a customer (e.g., via an online chat, via a phone call). Thus, the larger the number the more integrated the company's relationship with the customer. The company, departments of the company, and/or sub-departments of the company could select predetermined goals for the cumulative score for a time frame (e.g., 3 months). Further, it is contemplated herein that a single MSR could be evaluated based on "points" per time interval conversing with a customer. In this example, "points" is used to reference a positive association for the MSR/company/department/sub-department because of the generation and associated utilization of a note with respect to a customer.

In yet another example, the number of entries in the database, entered by one or more preselected people (e.g., a specific MSR, a specific group of MSRs, a sub-department, a department, a company, any group of people) may be compared to a predetermined threshold to determine if the company is utilizing these notes to the fullest extent that they could be.

Referring to FIG. 3, illustrated therein is an exemplary embodiment of a computing device as might be used when utilizing the systems and methods described herein. In one embodiment, computing device 300 includes memory 310, a processor 302, an interface device 304 (e.g., mouse, keyboard, monitor), a network device 306. Memory 310 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 100, for instance, a telephone network, a local area network ("LAN"), the Internet, and/or a wireless network. In one example, memory 310 includes a series of computer instructions written in or implemented with any of a number of programming languages, as will be appreciated by those skilled in the art.

Memory 310 in one example includes RAM 312, hard drive 315, which may include database 316. Database 316 in one example holds information, such as information that relates to users and/or parties interacting with system 100. Further, database 316 may reside at a location other than on relationship management module 120. For instance, database 316 may reside on one or more computing devices or other third party devices as part of a cloud based or distributed computing environment.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one embodiment, engines/modules contain instructions for controlling processor 302 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A method of electronically utilizing content in a communication between a customer and a first representative, comprising:
   receiving, at a computing device associated with the first representative, the content;
   displaying, via a computing device associated with a second representative, the content and an input interface that is associated with rating the content;
   electronically receiving an indication that the second representative utilized the input interface; and
   storing the indication in a database as a database entry.

2. The method of claim 1, wherein the step of storing the indication in the database includes storing an identification of the first representative and an identification of the second representative, and wherein both identifications are associated with the database entry, the method further comprising:
   querying the database for a number of database entries that are associated with a queried representative that is either the first representative or the second representative;
   generating a rating for the queried representative, wherein the rating is at least partly based on the number of database entries; and
   identifying whether a predetermined criteria is satisfied, wherein the identification is at least partly based on the number of database entries.

3. The method of claim 1, wherein the step of storing the indication in the database includes storing an identification of the first representative and an identification of the second representative, and wherein both identifications are associated with the database entry, the method further comprising:
querying the database for a number of database entries that are associated with a queried representative as the first representative, wherein the query is further based on database entries made within a time period; and
identifying whether a predetermined criteria is satisfied, wherein the identification is at least partly based on the number of database entries within the time period.

4. The method of claim 1, wherein the communication between the customer and the first representative consists of a telephonic communication.

5. The method of claim 1, wherein the step of storing the indication in the database comprises storing an identification of the first representative and an identification of the second representative, and wherein both identifications are associated with the database entry.

6. The method of claim 2, wherein querying the database includes querying the database for database entries that were stored within a specified time period.

7. The method of claim 6, wherein the time period is the previous week.

8. The method of claim 2 further comprising:
querying the database for a first number of database entries that are associated with a queried representative as the first representative, wherein the entries were stored within a first time period;
querying the database for a second number of database entries that are associated with the queried representative as the second representative, wherein the entries were stored within the first time period; and
displaying the first and second numbers.

9. The method of claim 8, the method further comprising:
querying the database for a third number of database entries that are associated with the queried representative as the first representative, wherein the entries were stored within a second time period;
querying the database for a fourth number of database entries that are associated with the queried representative as the second representative, wherein the entries were stored within the second time period; and
displaying the first, second, third and fourth numbers.

10. The method of claim 1, the method further comprising:
querying the database for a first number of database entries that have been stored in a time period by one or more preselected people;
comparing the first number to a predetermined threshold; and
based on the comparison, sending an alert if the first number is less than the predetermined threshold.

11. The method of claim 2, the method further comprising:
comparing a number of database entries associated with a second representative to a predetermined threshold; and
generating a reward event when the number of database entries associated with the second representative is equal to or greater than the predetermined threshold.

12. The method of claim 2, the method further comprising:
querying the database for a number of database entries that are associated with a queried representative as the first representative;
comparing the number of database entries to a predetermined threshold; and
generating a reward event when the number is at least equal to the predetermined threshold.

13. The method of claim 12, the method further comprising:
querying the database for a second number of database entries that are associated with a queried representative as the second representative;
comparing the second number of database entries to the predetermined threshold; and
generating a second reward event when the second number is at least equal to the predetermined threshold.

14. A non-transitory computer readable storage medium and a computer program embedded therein, the computer program comprising instructions, which when executed by one or more computer systems cause the one or more computer systems to:
receive, at a computing system associated with a first representative, content;
display, via a computing system associated with a second representative, the content and an input interface that is associated with rating the content;
receive an indication that the second representative utilized the input interface; and
store the indication in a database as a database entry.

15. The non-transitory computer readable storage medium of claim 14, wherein the communication between the customer and the first representative consists of a telephonic communication, and wherein the step of storing the indication in the database includes storing an identification of the first representative and an identification of the second representative, and wherein both identifications are associated with the database entry, the instructions further causing the one or more computer systems to:
query the database for a number of database entries that are associated with a queried representative as either the first representative or the second representative; and
generate a rating for the queried representative, wherein the rating is at least partly based on the number of database entries.

16. The non-transitory computer readable storage medium of claim 14, wherein the database is associated with a first company, the method further comprising:
determine that the first company does not provide a good or service associated with the database entry; and
based on that determination, send information related to the database entry to a second company.

17. The non-transitory computer readable storage medium of claim 14, wherein the communication between the customer and the first representative includes a telephonic communication, and wherein the step of storing the indication in the database includes storing an identification of the first representative and an identification of the second representative, and wherein both identifications are associated with the database entry, the instructions further causing the one or more computer systems to:
query the database for a first number of database entries that are associated with a queried representative as either the first representative or the second representative, wherein the first number of database entries were stored within a first time period;
query the database for a second number of database entries that are associated with the queried representative as either the first representative or the second representative, wherein the second number of database entries were stored within a second time period; and
generate a rating for the queried representative, wherein the rating is at least partly based on the first and second numbers of database entries.

18. A method of electronically utilizing content in a communication between a customer and a first representative, the method comprising:
- receiving, at a computing device associated with the first representative, the content;
- displaying, via a computing device associated with a second representative, the content and an input interface that is associated with rating the content;
- electronically receiving an indication that the second representative utilized the input interface; and
- storing the indication in a database as a database entry.

19. The method of claim 18, wherein the step of storing the indication in the database includes storing an identification of the first representative and an identification of the second representative, and wherein both identifications are associated with the database entry, the method further comprising:
- querying the database for a first number of database entries that are associated with a queried representative as the first representative, wherein the first number of database entries were stored within a first time period;
- querying the database for a second number of database entries that are associated with the queried representative as the second representative, wherein the second number of database entries were stored within the first time period; and
- generating a rating for the queried representative, wherein the rating is at least partly based on the first and second numbers.

20. The method of claim 18, wherein the first representative represents a company, the method further comprising generating a rating for a relationship between the customer and the company, wherein the rating is at least partly based on the first and second numbers.

* * * * *